United States Patent [19]

Koh et al.

[11] Patent Number: 4,662,225
[45] Date of Patent: May 5, 1987

[54] SEISMIC DETECTOR

[75] Inventors: Hiroshi Koh, Kyoto; Takashi Tokuyama, Souraku, both of Japan

[73] Assignee: Fujitec Co., Osaka, Japan

[21] Appl. No.: 729,117

[22] Filed: Apr. 30, 1985

[30] Foreign Application Priority Data

| May 1, 1984 | [JP] | Japan | 59-88902 |
| Dec. 8, 1984 | [JP] | Japan | 59-259795 |
| Dec. 8, 1984 | [JP] | Japan | 59-259796 |
| Dec. 20, 1984 | [JP] | Japan | 59-269964 |
| Jan. 16, 1985 | [JP] | Japan | 60-6333 |
| Jan. 17, 1985 | [JP] | Japan | 60-7256 |

[51] Int. Cl.$^4$ .......................................... G01N 29/00
[52] U.S. Cl. ..................................... 73/655; 340/601
[58] Field of Search .......................... 73/655; 340/601

[56] References Cited

U.S. PATENT DOCUMENTS

Re. 31,248  5/1983  Berger et al. .................... 73/655
4,083,255  4/1978  McKechnie ....................... 73/655

Primary Examiner—Anthony V. Ciarlante
Attorney, Agent, or Firm—Price, Gess & Ubell

[57] ABSTRACT

The disclosure is directed to an improved a seismic detector comprising: a container for containing liquid therein, liquid means being contained in the bottom of the container, a source of light for illuminating the inside of the container, a sensor means having at least one photoelectric device for transforming the light inside the container into electric signals, and a signal processor means for generating an output when the output of the sensor means exceeds a predetermined value.

25 Claims, 42 Drawing Figures

SEISMIC DETECTOR

FIELD OF THE INVENTION

This invention relates to a seismic detector which can detect seismic waves.

DESCRIPTION OF PRIOR ART

A seismic detector should be equipped in machines which need to be stopped at the beginning of a great earthquake. For example, it should be provided as equipment in a control room of elevator systems; so that at the onset of a great earthquake, an elevator car should be stopped or carried to the floor nearest to the elevator car at the instant of the detection of the earthquake in order to protect the elevator and the passengers; after the earthquake, the elevator should be operated without delay if no damages to the elevator are confirmed.

Figure 1:
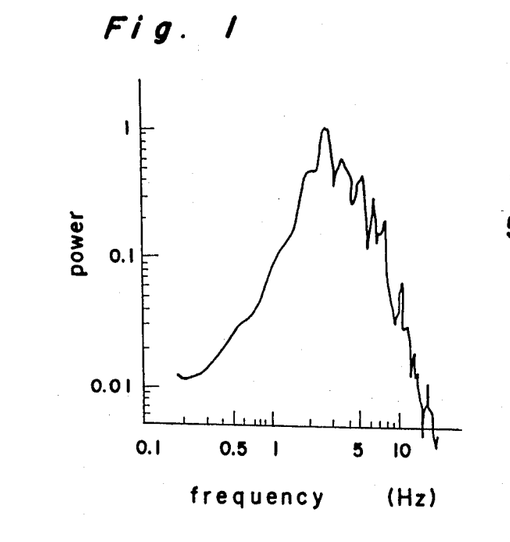
FIG. 1 is graph of a power spectra of seismic waves.

Seismic waves are known to have main components at frequencies between 1-10 Hz, especially remarkably between 1-5 Hz. For example, FIG. 1 shows power spectra of seismic waves observed at Ofunato, Miyagi, Japan, on an earthquake off the coast of Miyagi prefecture, which occurred at 17:14, June 12, 1978. The power spectra have main components between 1-5 Hz with a dominant frequency at 2-3 Hz (2.4 Hz). (The Fourier spectra (not shown) have frequency dependence similar to the abovementioned power spectra, and they also have large components between 1-5 Hz.)

When an earthquake happens, primary tremors arrive first usually, except the earthquake whose hypocenters happen under a big city. After about seven to thirty seconds pass, main waves which may cause disaster will arrive. The time interval depends on the distance between the hypocenter and the observatory, and the abovementioned values are experimental data.

Both primary tremors and main waves consist of longitudinal waves and transversal waves; longtudinal waves observed mainly as "vertical vibration" are and transversal waves are observed mainly as "horizontal vibration" at the observating place. Primary waves (P-waves) are characterized to consist of longitudinal waves and to have relatively small acceleration up to as large as ten to a few tens gals, while main waves (S-waves) are characterized to consist of transversal waves and to have acceleration up to above thirty gals in great earthquakes.

It should be noted that external disturbances caused by electric trains, dump cars, construction works, rotary machines, etc. also rock the ground and buildings. The acceleration of external disturbances may become as large as up to ten gals, that is, of the same order of that of primary tremors. The vibration due to such external disturbances consists mainly of horizontal vibration, and its power spectra has main components usually above 20 Hz, but it also contains components around 10 Hz. Therefore, it is required that a seismic detector detects only seismic waves in order to prevent malfunctions.

For example, the technical standard of the antiseismic design and the construction guidelines of the Japan Elevator Association requires for a seismic detector that, as for the frequency characteristics of the sensitivity, it should have the flat characteristics in the range between 1 and 5 Hz for a normal class and between 0.1 and 5 Hz for a precision class, respectively, and that it should have falling characteristics in the range over 5 Hz. The falling characteristics are needed to detect only seismic waves.

Previously the following types of seismic detector have been used: electrodynamic type, strain gauge type, piezo-electric type, and weight drop type.

Figure 2:
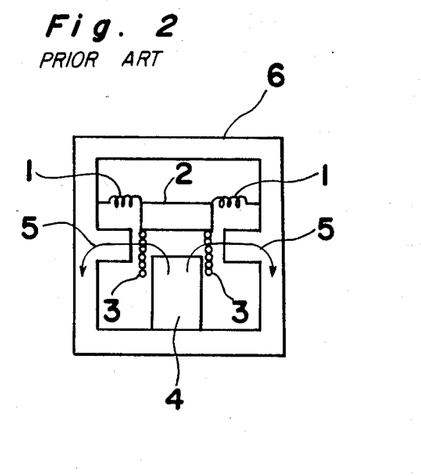
FIG. 2 is a crosssection of a seismic detector of the electrodynamic type.

FIG. 2 shows an example of the structure of a seismic detector of the electrodynamic type. When a coil 3 oscillates vertically in the magnetic flux 5 generated by a permanent magnet 4, an electromotive force is generated between the terminals of the coil 3 fixed to a weight 2. The electromotive force is proportional to the moving velocity of the coil 3. A yoke 6 forms a magnetic path and supports the weight 2 by spring means 1.

A seismic detector of the electrodynamic type has disadvantages in that it is difficult to obtain an excellent precision and it is difficult to adjust the detector so as to have a desirable characteristic. Since the natural frequency of the spring systems 1 is usually chosen to be about 4 Hz, it is difficult for a seismic detector of this type to have the falling characteristics above 5 Hz as required above. Usually, the falling characteristics are realized only above 10 Hz. Furthermore, the natural frequency is affected by the spring systems 1 and the weight so that a seismic detector of this type needs to be adjusted at the final manufacturing process by handwork, for example, as for the weight 2.

Figure 3:
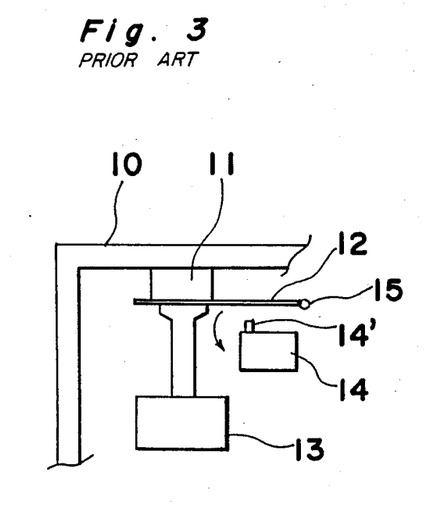
FIG. 3 is a crosssection of a seismic detector of the weight drop type.

FIG. 3 shows an example of a seismic detector of the weight drop type. Usually, a weight 13 (made of a magnetic material such as iron) is attracted to a permanent magnet 11 fixed to a container 10. When vibrations exceeding a predetermined level are exerted on the container, the weight 13 drops and the lever 12 fixed thereto rotates around an axis 15, as shown by an arrow, and an actuator 14' of a microswitch 14 equipped for generating a detection signal of seismic waves is actuated by the lever 12.

A seismic detector of the weight drop type has difficult problems with respect to the precision and the reliability thereof. The adjustment of the detection level is difficult because it depends on the attractive force of the permanent magnet 11 and the weight of the weight 13. Also with a seismic detector of this type, it is hard to detect vibrations of low frequency below one Hz.

A seismic detector of the strain gauge type consists of a pair of strain gauges equipped each in the X and Y directions, and the acceleration is obtained by the vector sum of the electric outputs of both strain gauges. A seismic detector of this type lacks reliability because it has many error factors. For example, an electric filter is used to decrease the output of a strain gauge above five Hz because the frequency characteristics of a usual strain gauge itself extend up to a few kHz. Therefore, a seismic detector of the strain gauge type depends largely on the characteristics of the electric filter. Furthermore, a multiplier is needed in order to obtain the vector sum of the signals in the X and Y directions.

A seismic detector of the piezo-electric type also uses the vector sum method. Therefore, it has similar problems to those of the strain gauge type.

SUMMARY OF THE INVENTION

An essential object of the present invention is to provide a new type of a seismic detector which has a simple structure and can detect seismic waves correctly.

A seismic detector according to the present invention comprises a container for containing liquid therein, liquid means being contained in the bottom of the container, a source of light for illuminating the inside of the container, a sensor means having at least one photoelectric device for transforming the light inside the container into electric signals, and a signal processor means for generating an output when the output of the sensor means exceeds a predetermined value.

When the liquid in the container is rocked by seismic waves, the distribution of the brightness inside the container changes due to the variation of the shape of the surface of the liquid. The photoelectric device detects the distribution of the brightness and transform it to the electric signal. The detected signal is roughly proportional to the acceleration of the vibration, and can have the falling frequency characteristics in the range over a specified frequency.

An advantage of a seismic detector according to the present invention is that it has a simple and reliable structure.

Another advantage of a seismic detector according to the present invention is that it can detect both S-waves and P-waves with high precision.

Other objects and advantages of the present invention may be understood with reference to the following detailed description of illustrative embodiments of the invention, taken together with the accompanying drawings in which:

DETAILED DESCRIPTION OF EMBODIMENTS

Example 1

Figure 4:
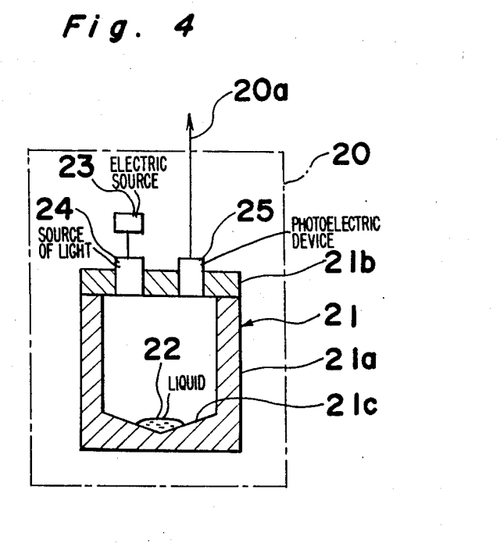
FIG. 4 is a crosssection of a seismic sensor of a first embodiment of the present invention.

FIG. 4 shows a cross section of a seismic sensor 20 of a first example according to the present invention. A small amount of liquid 22 such as mercury or oil is put inside a container 21. The container 21 is composed of a cylindrical base 21a and a cover 21b. The liquid 22 is located near the center of a cone-like bottom 21c of the cylindrical base 21a. A source of light 24 such as a light emitting diode and a photoelectric device 25 such as a photocell are fitted to the cover 21b of the container 21.

The electric source 23 supplies electric current to the source of light 24, and the latter 24 illuminates the inside of the container 21. The photoelectric device 25 detects the distribution of the brightness inside the container 21.

Figure 5A:
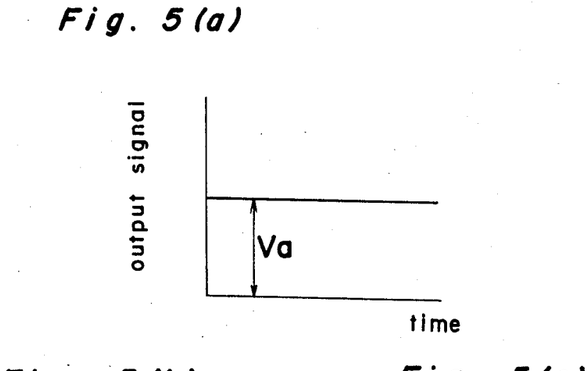
FIGS. 5(a)-(e) are graphs respectively showing the output voltage of the seismic sensor.
Figure 5B:
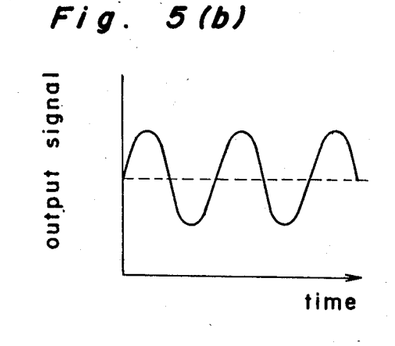
Figure 5C:
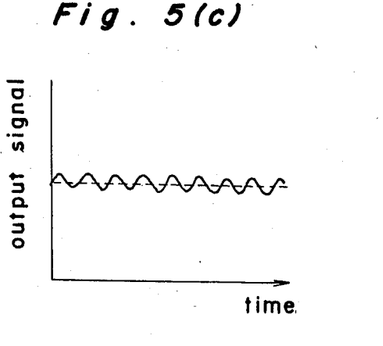

When the container 21 is stationary, the liquid 22 is also stationary. Then, the distribution of the brightness inside the container 21 is constant, and the output signal 20a of the photoelectric device 25 has only dc components shown in FIG. 5(a). On the contrary, when the liquid 22 is rocked for example by an earthquake, the form of the surface of the liquid 22 varies. Then, the mode of both reflection and scattering of the incident light changes so that the distribution of the brightness inside the container 21 varies. Thus, the output 20a of the photoelectric device 25 fluctuates, as shown in FIG. 5(b) for low frequencies and in FIG. 5(c) for high frequencies, respectively.

Figure 5D:
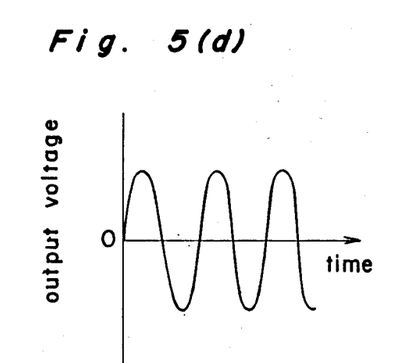
Figure 5E:
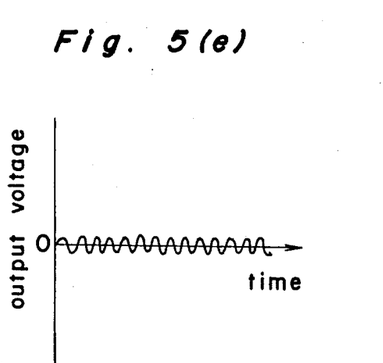
Figure 6:
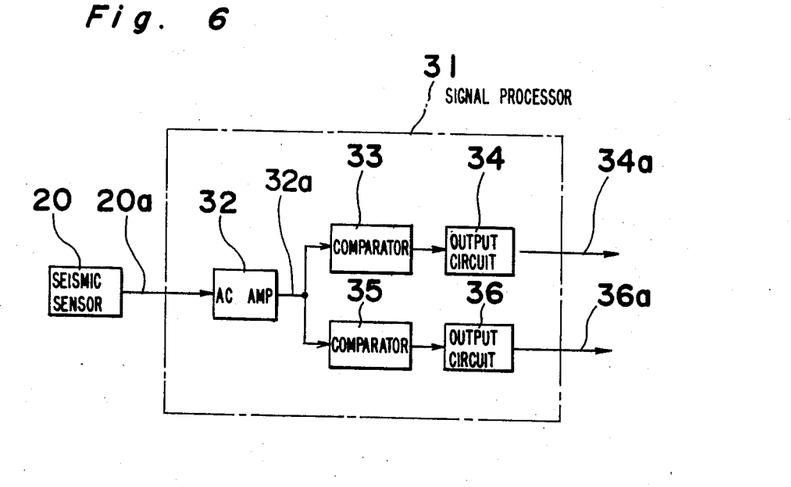
FIG. 6 is a block diagram of a signal processor.

A signal processor 31 distinguishes the level of the magnitude of seismic waves and provides a signal when the output signal 20a of the seismic sensor 20 becomes larger than a predetermined value. FIG. 6 shows a block diagram of an embodiment of a signal processor 31. FIGS. 5(d) and 5(e) show the output signal 32a amplified with a preamplifier (ac amplifier) 32 for low frequencies and for high frequencies, respectively; the output signal 32a has only ac components; it is compared with two predetermined values each at a first comparator 33 and at a second comparator 35. When the output signal 32a of the preamplifier 32 is larger than the first predetermined value, the first comparator 33 provides a signal to a first output circuit 34, and the latter 34 then gives an output signal 34a to a control system (not shown). When the output signal of the preamplifier 32 is larger than the second predetermined value, the second comparator 35 provides a signal to a second output circuit 36, and the latter 36 then gives an output signal 36a to the control system. An electric filter (not shown in FIG. 6) may be added after the preamplifier 32 in order to remove noises.

An arbitrary number of stages can be set in order to distinguish the magnitude of seismic waves by providing a plurality of set which is composed of a comparator and an output circuit.

Figure 7:
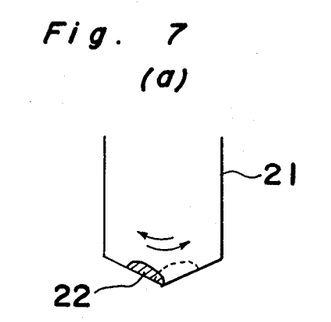
FIG. 7(a) and FIG. 7(b) are schematical sectional views showing behaviors of the liquid put in the container when rocked in a horizontal direction at low frequencies and at high frequencies, respectively.

The mode of the change of the shape of the liquid 22 varies with the frequency of the vibration of the container 21. When the container 21 is rocked in a horizontal direction (as in S-waves) at low frequencies, the liquid 22 moves largely as shown in FIG. 7(a) in directions displayed with arrows. On the contrary, the liquid 22 fluctuates in a horizontal direction at high frequencies, it does not move and only its surface ripples. Then, the distribution of the brightness inside the container 21 varies with the frequency of the vibration of the container 21.

Figure 8:
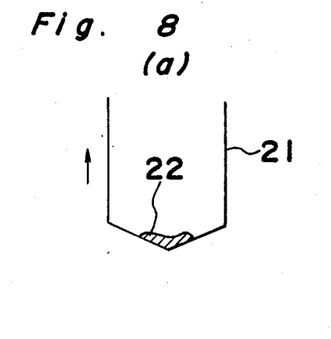
FIG. 8(a) and FIG. 8(b) are schematical sectional views showing behaviour of the liquid put in the container when rocked in the vertical direction upward and downward, respectively.

When the container 21 rises and falls in a vertical direction (as in P-waves), the liquid 22 inside the container 21 fluctuates as shown in FIG. 8(a) and in FIG. 8(b), respectively. The variation of the distribution of the brightness inside the container 21 can also be detected by the photoelectric device 25. It is found that horizontal vibration can also be detected similarly.

Mercury or oil having a moderate viscosity can be used for the liquid 22 put in the container 21.

Figure 9A:
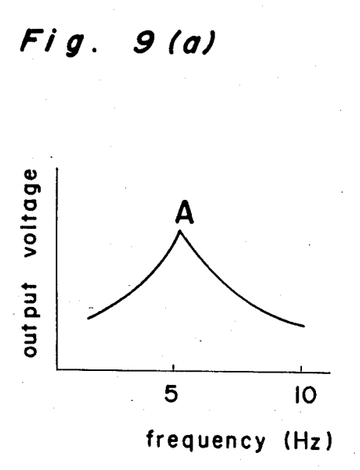
FIG. 9(a) and FIG. 9(b) are graphs of the output voltage of a seismic detector having mercury as the liquid, when rocked in the horizontal direction and in the vertical direction, respectively.
Figure 9B:
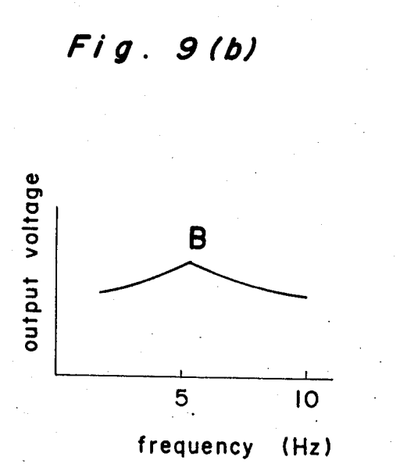

When mercury which has a high specific density and a higher surface reflectivity is put in the container 21 as the liquid 22, the output voltage 32a of the preamplifier 32 depends on the vibration frequency of the container 21 as shown in FIG. 9(a) for the horizontal vibration. It is clear that the output voltage for the horizontal vibration has a remarkable peak A around 5 Hz. The output voltage has also a peak B for the vertical vibration. It is also found that the frequency at which the output voltage has peaks A, B depends on the amount of mercury.

Figure 10A:
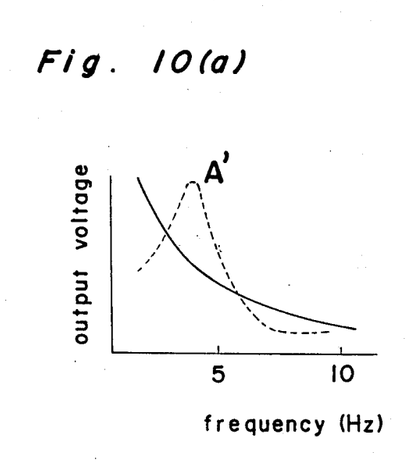
FIG. 10(a) and FIG. 10(b) are graphs of the output voltage of a seismic sensor, having aviation operating oil as the liquid, rocked in the horizontal direction and in the vertical direction, respectively.
Figure 10B:
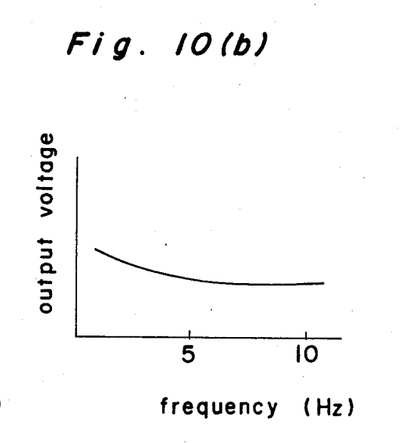

When an oil which has lower specific density and higher transmittancy (for example, an engine oil or aviation operating oil) is put as the liquid 22, the output voltage 32a of the preamplifier 32 depends on the vibration frequency of the container 21 as shown in FIG. 10(a) for the horizontal vibration and in FIG. 10(b) for the vertical vibration. As for the horizontal movement (FIG. 10(a)), the output voltage has a peak A' (dashed line) when the amount of the oil is much and it decreases with increasing vibration frequency (solid line) when the amount of the oil is little. As for the vertical movement (FIG. 10(b)), the output voltage decreases with increasing vibration frequency at first and then becomes roughly flat.

Figure 11:
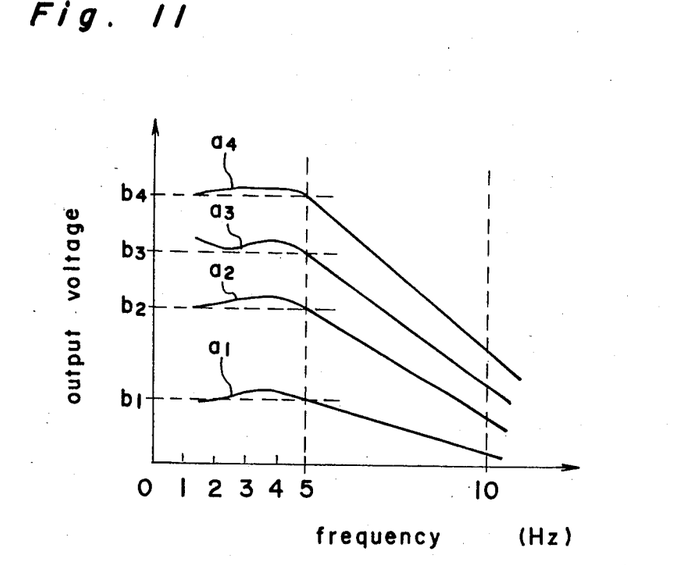
FIG. 11 is a graph of the output voltage plotted against frequency.

If a proper amount of an engine oil is used for the liquid 22, the frequency dependence of the output characteristics of the output voltage 32a becomes appropriate for a seismic detector, as shown in FIG. 11. The output voltage shown in FIG. 11 is the value amplified by the preamplifier 32. The parameters $a_1$, $a_2$, $a_3$ and $a_4$ which represent the acceleration of the vibration are 30, 80, 120 and 150 gals, respectively. The output voltage $b_1$, $b_2$, $b_3$ and $b_4$ at 5 Hz each measured at the acceleration 30, 80, 120 and 150 gals are 0.45, 1.2, 1.85 and 2.3 V, respectively. That is, the output voltage is almost proportional to the magnitude of the acceleration of the vibration. Therefore, the distribution of the brightness inside the container 21 detected with a photoelectric device changes linearly with the acceleration.

Furthermore, the data shown in FIG. 11 shows clearly the frequency characteristics almost flat in a range between 1 and 5 Hz and the falling characteristics at frequencies above 5 Hz. This frequency dependence of the output voltage resembles that of a seismic wave. Thus, a seismic detector of a first example has an ideal output characteristics for a seismic detector.

Example 2

Figure 12:
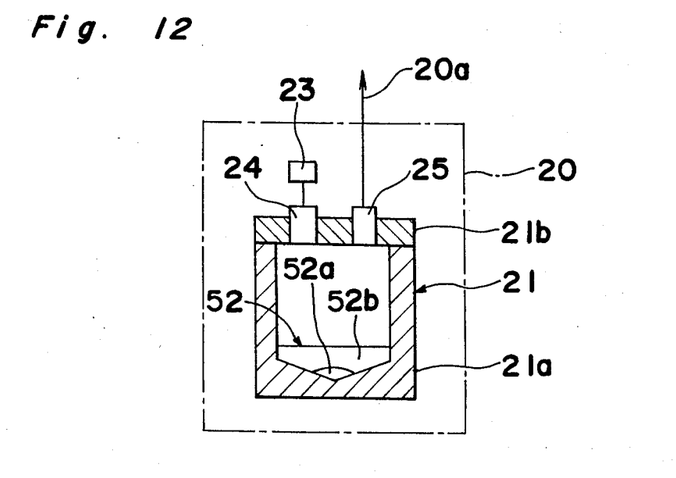
FIG. 12 is a cross section of a seismic sensor of a second example of the present invention.

The liquid 52 put in the container 21 of a seismic sensor can be a double layer which consists of two kinds of liquid 52a, 52b as shown in FIG. 12. A first liquid 52a may be mercury which has a high specific density and a high surface reflectivity, while a second liquid 52b may be an oil which has low specific density and high transmittancy. The two kind of liquids will complement with each other to have more appropriate frequency characteristics.

When the container 21 is stationary, the liquid 52 is also stationary. Then, the distribution of the brightness inside the container 21 is constant, and the output voltage 20a of the photoelectric device 25 has only the dc component. On the contrary, when the container is rocked for example by an earthquake, the liquid 52 of double layer is also rocked, and each shape of the surface of the liquid components 52a, 52b changes. Then, the mode of the reflection and the scattering of light varies, and the output voltage 20a of the photoelectric device 25 has ac components.

Figure 13A:
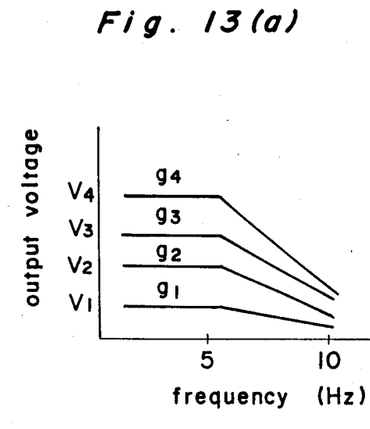
FIG. 13(a) and FIG. 13(b) are graphs of the output voltage of a seismic detector having the liquid of a double layer, rocked in the horizontal direction and in the vertical direction, respectively.
Figure 13B:
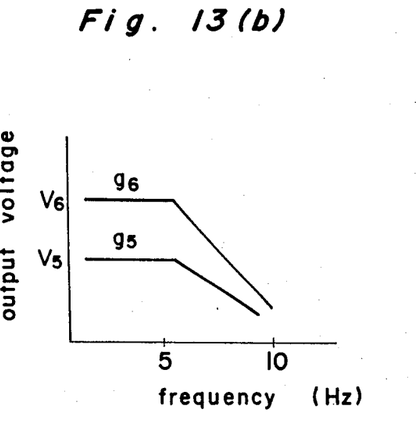

FIG. 13(a) and FIG. 13(b) shows the output voltage of a seismic sensor having the liquid 52 of a double layer rocked in the horizontal direction and in the vertical direction, respectively. A signal processor shown in FIG. 6 is used. The liquid 52 consists of mercury and aviation operating oil. The oil 52b gets on the mercury 52a because the former has a smaller specific density. The amounts of the liquid components 52a, 52b are the same as to have the output voltage characteristics shown in FIGS. 9(a), (b) and FIGS. 10(a), (b) (solid line), respectively. The parameters $g_1$, $g_2$, $g_3$ and $g_4$ of the curves in FIG. 13 (a) are the acceleration of the horizontal vibration, and the values $V_1$, $V_2$, $V_3$ and $V_4$ are the output voltage at 5 Hz of the vibration of acceleration $g_1$, $g_2$, $g_3$ and $g_4$, respectively. The parameters $g_5$ and $g_6$ of the curves in FIG. 13 (b) are the acceleration of the vertical vibration, and the values $V_5$ and $V_6$ are the output voltage at 5 Hz of the vibration of acceleration $g_5$ and $g_6$, respectively. FIGS. 13(a), (b) shows clearly that the frequency dependence of the output voltage for both horizontal and vertical directions has almost the flat characteristics in the range between 1 and 5 Hz. In other words, the frequency characteristics of the output voltage is similar to that of seismic waves. Therefore, a seismic detector of this Example has an ideal frequency characteristics for both horizontal and vertical directions.

As contrasted with a seismic detector having a single kind of liquid 52, a seismic sensor having liquid 52 of a double layer can have the flat frequency characteristics in a range between 1 and 5 Hz. The reason why the liquid 52 consisting of two kinds of liquids 52a, 52b has better frequency characteristics will be explained as follows. At high frequencies around 5 Hz, a peak A (a resonance point) of the mercury 52a is suppressed by the damping action of the aviation operating oil 52b, while at low frequencies, the decrease of the output voltage with decreasing frequency of the mercury 52a is complemented by the increase of the aviation operating oil 52b. Thus, a liquid of double layer consisting of appropriate amounts of two kinds of liquids allows a seismic sensor 20 to have the flat frequency characteristic between 1 and 5 Hz.

Example 3

Figure 14:
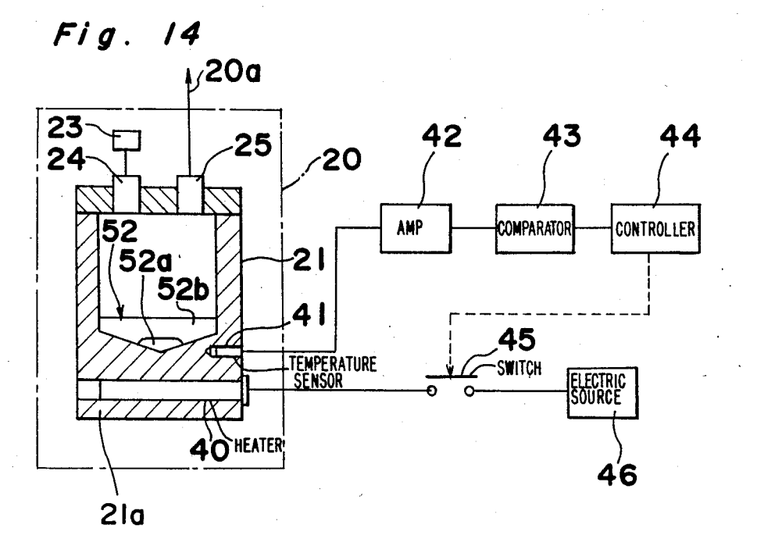
FIG. 14 is a cross section of a seismic sensor of Example 3 with the block diagram of a temperature controller.

The sensitivity of a seismic sensor 20 may be affected by temperature because the viscousity of an oil 52b changes with the ambient temperature. FIG. 14 shows a seismic sensor 20 whose temperature can be controlled. It has the same structure as that of Example 2 except that a temperature sensor 41 such as a thermistor and a heater 40 are installed in the cylindrical base 21a of the container 21.

A temperature regulator comprises of an amplifier 42, a comparator 43, a controller 44, a switch 45 and an electric source 46 for the heater 40. If the temperature which corresponds with the input voltage from the amplifier 42 decreases below a predetermined temperature (for example, 0° C.), the comparator 43 transmitts a signal to the controller 44, while if the temperature increases above another predetermined temperature (for example, 10° C.), the comparator 43 stops to transmit the signal to the controller 44. The controller 44 makes the switch 45 open or close according as the comparator 43 transmitts the signal to the controller 44 or not.

Figure 15A:
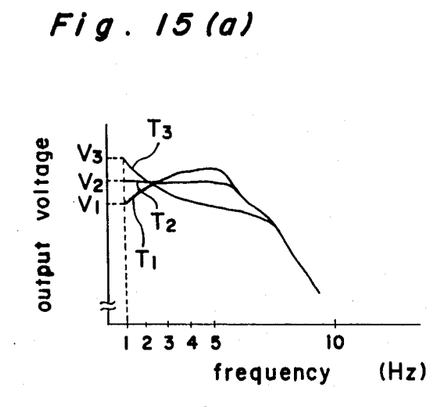
FIG. 15(a) and FIG. 15(b) are graphs of the temperature dependence of the output voltage of a seismic sensor rocked in the horizontal and vertical direction, respectively.
Figure 15B:
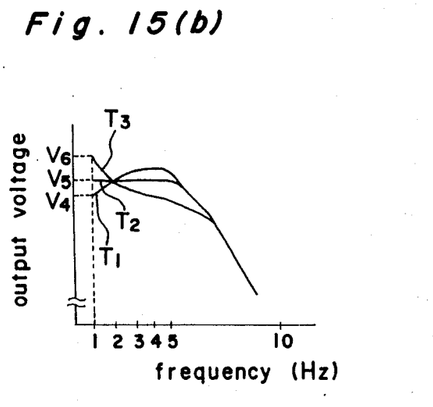

FIG. 15(a) and FIG. 15(b) show the temperature dependence of the output characteristics of a seismic sensor rocked in the horizontal and vertical direction, respectively. A signal processor shown in FIG. 6 is used. The output characteristics changes as the viscosity of an oil 52b (aviation operating oil) contained in the liquid 52 decreases with increasing temperature. In this Example, the output characteristics has the flat characteristics at a temperature $T_2$ (0° C.) but not at a higher temperature $T_1$ (about 40° C.) and at a lower temperature $T_3$ (about $-10°$ C.). Therefore, it is desirable that the temperature of the liquid 52 is kept in a temperature range wherein the flat characteristics exists. Even when a seismic sensor 20 is used in an environment where the temperature is liable to become cold as low as $T_3$, the liquid 52 can be kept normal where the flat characteristics are realized in this Example. Thus, a seismic detector of this type can be used in any cold regions.

Example 4

Figure 16A:
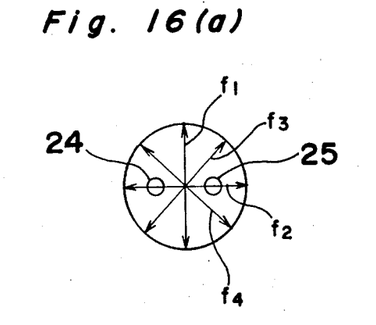
FIG. 16(a) is a diagram of the direction of the vibration.
Figure 16B:
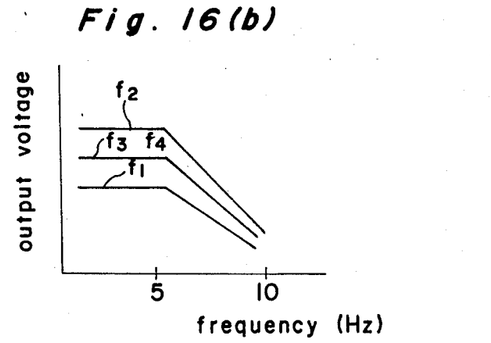
FIG. 16(b) is a graph of the frequency dependence of output voltage of a seismic sensor rocked in the directions shown in FIG. 16(a)

When the light emitting diode 24 and the photoelectric device 25 is arranged horizontally as in Examples 1–3, the sensitivity of a seismic detector may change with the direction of the horizontal vibration even if the amplitude g of the acceleration is kept constant. As shown in experimental data in FIGS. 16(a), (b), the output voltage is maximum when a sensor 20 is rocked in the direction $f_2$ which is parallel to the direction from the light emitting diode 24 to the photoelectric device 25. The output voltage decreases as the direction of the vibration of a seismic sensor 20 deviates from the direction $f_2$. When a seismic sensor 20 is rocked in a direction $f_1$ perpendicular to $f_2$, the output voltage becomes low. Because the output voltage differs with the direction of the vibration even when the amplitude of the acceleration is constant, a seismic sensor 20 is liable to err in detecting the magnitude of an earthquake.

Figure 17:
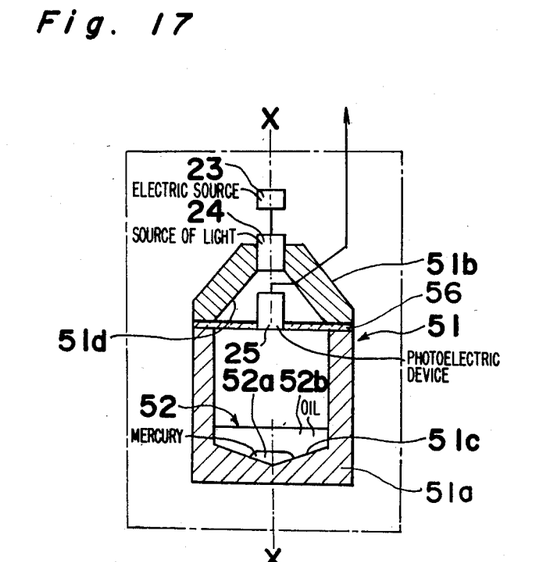
FIG. 17 is a cross section of a seismic sensor of Example 4.

FIG. 17 shows a seismic sensor 20 of a fourth example according to the present invention wherein a source of light 24 and a photoelectric device 25 is arranged vertically along the central line X—X of the container 51. A small amount of liquid 52 of double layer is put inside a container 51. The mercury 52a locates at the center of a cone-like bottom 51c. A source of light 24 such as a light emitting diode is fixed at the top of a cone-like cover 51b of the container 51, the electric source 23 supplies the electric current to the source of light 24. The photoelectric device 25 is fixed at the center of a plate 56 placed between the cover 51b and the cylindrical base 51a of the container 51. The plate 56 is made of a transparent material which allows the light to transmit to the liquid 52. The inner surface 51d of the cover 51b has high surface reflectivity so as to collect the light inside the container effectively to the photoelectric device 25. A signal processor shown in FIG. 6 is used.

Figure 18A:
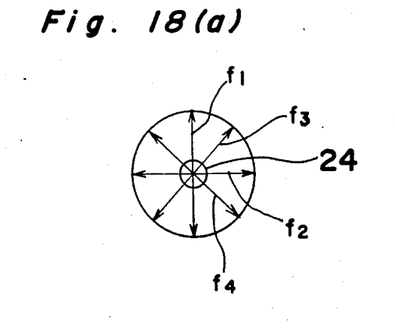
FIG. 18(a) is a diagram of the direction of the vibration.
Figure 18B:
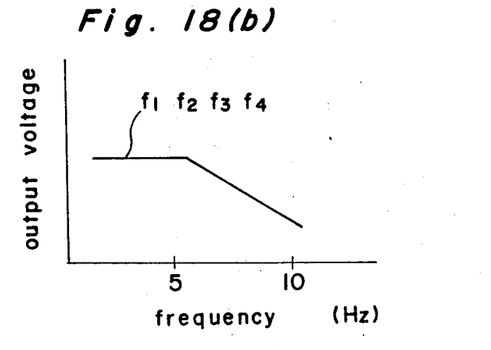
FIG. 18(b) is a graph of the frequency dependence of the output voltage of a seismic sensor rocked in the directions shown in FIG. 18(a)

When this type of a seismic sensor 20 is rocked horizontally, according to the vertical arrangement of the source of light 24 and the photoelectric device 25, the amount of the light transmitted to the photoelectric device 25 does not change nearly irrespective of the directions of the vibration as far as the amplitude of the acceleration is kept constant as shown in FIG. 18(a). Thus, the output voltage of a seismic detector does not depend on the direction of the horizontal vibration as shown is FIG. 18(b).

The positions of the source of light 24 and the photoelectric device 25 may be reversed.

Figure 19:
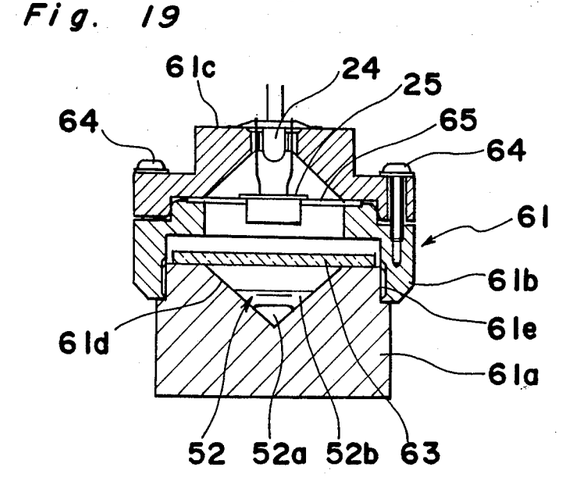
FIG. 19 is a cross section of another Example 4 of a seismic sensor.

FIG. 19 shows a sensor 20 which can be handled roughly in such situations as a transportation process. This type of a seismic sensor 20 prevents, for example, the adhesion of the liquid 52 to the inner surface of the container 61 and to the photoelectric device 25. A container 61 is composed of a cylindrical base 61a, a ring 61b and a cover 61c. A liquid 52 of double layer is put on a cone-like hole 61d having a predetermined apex angle. The liquid 52 consists of mercury 52a and aviation operating oil 52b. A transparent plate 63 is fixed to the cylindrical base 61a with a binding agent so as to cover the cone-like bottom 61d. The ring 61b and the cylindrical base 61a are fixed with screw threads 61e with each other. The cover 61c and the ring 61b are fastened with bolts 64, and a transparent plate 63 is interposed between them. A photoelectric device 25 is set through a hole at the center of the transparent plate 63. A light emitting diode 24 is set in the hole at the center of the cover 61c. The light emitting diode 24, the photoelectric device 25 and the apex of the cone-like hole 61d are arranged along a vertical line.

Example 5

It is necessary for a seismic detector to discern preliminary tremors fast and correctly so as to warn and meet the main waves which will arrive after the preliminary tremors. Then, a seismic detector should be able to distinguish preliminary tremors from external disturbances because external disturbances may have vibration energy of the same order of that of preliminary tremors.

Furthermore, it is also required that a seismic detector can detect both P-waves and S-waves. However, the situation is not so simple. Though seismic waves consist of both vertical waves and horizontal waves, main waves consist mainly of horizontal waves while preliminary tremors mainly of vertical waves. It should also be noted that external disturbances consist mainly of horizontal waves.

Figure 20:
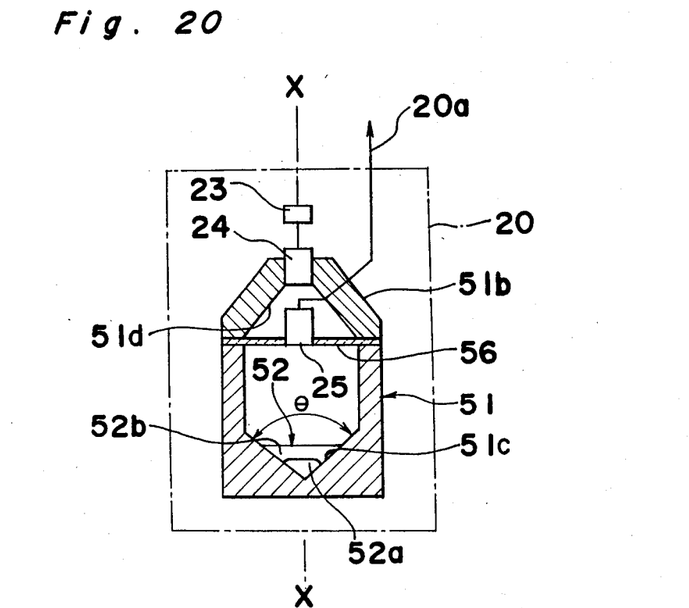
FIG. 20 is a cross section of Example 5 of a seismic sensor.

The apex angle $\theta$ of the cone-like bottom 51c of the container 51 plays an important role to detect seismic waves. FIG. 20 shows a seismic sensor 20 used in order to examine this point. It has the same structure as that shown in FIG. 17 except the shape of the cone-like bottom 51c and the amount of the liquid 52. The liquid 52 consists of 1.5 grs of mercury 52a and 0.35 grs of aviation operating oil 52b.

Figure 21:
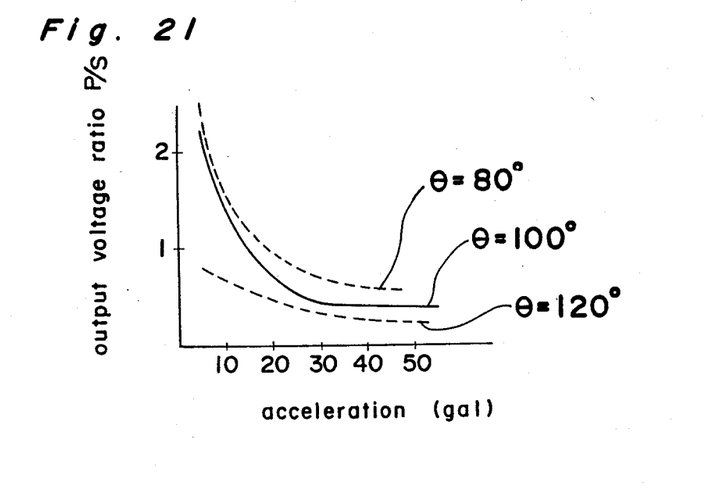
FIG. 21 is a graph of the output voltage ratio P/S plotted against acceleration.

Output voltage ratio P/S is plotted in FIG. 21 against acceleration for three containers having different apex angle $\theta$. The output voltage ratio P/S is the ratio of the output voltage of the seismic sensor rocked in the vertical direction to that rocked in the horizontal direction obtained in a vibration test. When $\theta$ is 120°, the output voltage ratio P/S is so small at around 10 gals that preliminary tremors may not be detected adequately in the presence of external vibrations. On the other hand, when $\theta$ is 80°, the output voltage ratio P/S is so large above 30 gals that main waves cannot be detected correctly. When $\theta$ is around 100°, the output voltage ratio P/S is 1.5 to 2 at about 10 gals and it is 0.5 at about 30 gals. If $\theta$ is set equal to 100°, it becomes possible to detect not only P-waves but also S-waves surely. This was comfirmed by a vibration test based on the record of seismic waves of El Centoro earthquake.

Figure 22A:
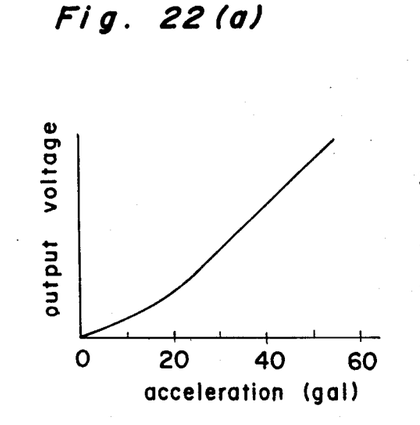
FIG. 22(a) and FIG. 22(b) are graphs of the acceleration dependence of the output voltage of a seismic sensor rocked in the horizontal direction and in the vertical direction, respectively.
Figure 22B:
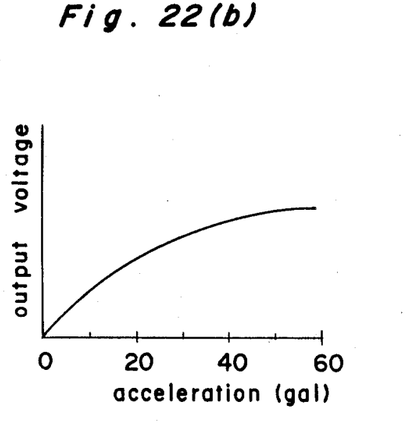

FIG. 22(a) and FIG. 22(b) show the acceleration dependence of the output voltage rocked in the horizontal direction and in the vertical direction, respectively, when the apex angle $\theta$ is 100°. A signal processor shown in FIG. 6 is used. The mode of the vibration of the liquid 52 is different between vertical and horizontal vibration, and the distributions of the brightness in the container 51 for vertical and horizontal varies differently with each other with increasing frequency. The sensitivity to horizontal vibrations (FIG. 22(a)) is low at low accelerations while it increases linearly at high accelerations. On the other hand, the sensitivity to vertical vibrations (FIG. 22(b)) is high at low accelerations while low at high accelerations.

Experimental data shows that seismic waves can be detected correctly and surely by a seismic sensor having the apex angle 100°. That is, if the output voltage ratio P/S is as high as 1.5 to 2 in the acceleration region below about 10 gals, that is, if the sensitivity to vertical vibrations is made much higher than that of horizontal vibrations, preliminary tremors which consist mainly of vertical vibrations and have acceleration below about 10 gals can be detected even in the presence of external disturbances which consist mainly of horizontal waves and have low acceleration of about 10 gals. On the other hand, if the output voltage ratio P/S is below about 0.5, that is, if the sensitivity to horizontal vibration is made much higher than that of vertical vibrations, main waves which consist mainly of horizontal vibrations can be detected correctly. In other words, a seismic sensor 20 does not detect external disturbances.

Figure 23A:
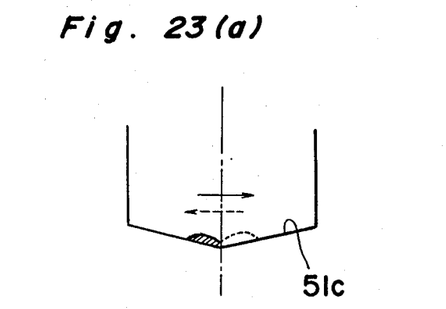
FIG. 23(a) and FIG. 23(b) are diagrams of the motion of the liquid rocked in the horizontal direction and in the vertical direction, respectively.

The increase of the output voltage ratio P/S with decreasing $\theta$ can be explained qualitatively as follows: because the viscous oil 52b of one component of the fluid 52 of double layers serves only to dampen the motion of mercury 52a which has high specific density and high surface reflectivity. FIG. 23(a) shows the motion of the fluid 52a in a seismic sensor having large $\theta$ and rocked in the horizontal direction (S-waves). When $\theta$ is made larger or the slope of the cone-like bottom 51c is made gentler, the liquid 52a becomes easier to move in the horizontal direction.

Figure 23B:
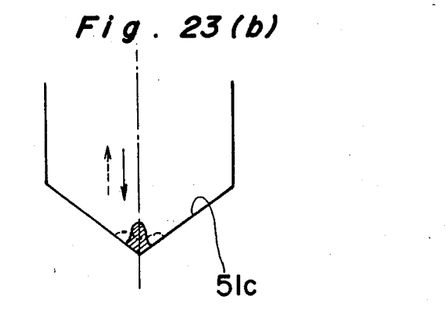
Figure 24A:
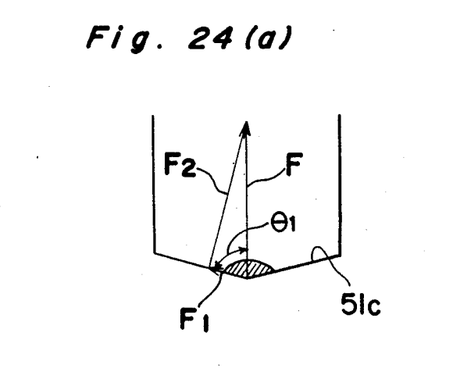
FIG. 24(a) and FIG. 24(b) are diagrams of the components of the force F.
Figure 24B:
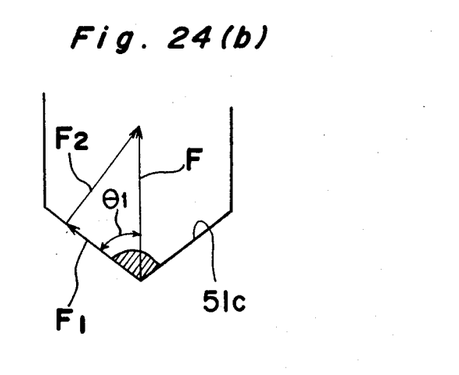

On the other hand, when a seismic sensor 20 is rocked in the vertical direction (P-waves) as shown in FIG. 23(b), the liquid 52a deforms in a mode different from that shown in FIG. 23(a). Then, it is thought that the liquid 52a becomes easier to deform with decreasing $\theta$ because the friction resistance of the liquid 52a to the cone-like bottom 51c due to the surface tension of the liquid 52a becomes smaller. The liquid 52a is thought to deform mainly by opposing the friction resistance at the core-like base 51c. As shown in FIGS. 24(a) and 24(b), the vibration force (reaction) F in the vertical direction can be composed of a component $F_1$ along the slope 51c and a component $F_2$ perpendicular to the slope 51c. It should be noted that $F_1$ increases with decreasing $\theta$. The deformation of the liquid 52a due to the force $F_2$ is smaller than that due to the force $F_1$ because the surface tension of the liquid 52a is large. Thus, it can be understood why the output voltage ratio P/S increases with decreasing $\theta$.

In this Example, the liquid 52 is composed of mercury 52a and aviation operating oil 52b. Even when the amounts of the components 52a, 52b of the fluid 52 is changed or different kinds of fluids are used, a seismic detector which can detect both preliminary tremors and main waves can be constructed by examining the optimum amounts of fluids and the optimum shape of the container 51.

Example 6

The detection characteristics of a seismic detector according to the present invention are affected by a variety of factors such as the shape of the container 51, the kind and the amount of the liquid 52, the characteristics of the photoelectric device 25 itself. Especially, if the intensity of the light emission of the source of light 24 and the detection characteristics of the photoelectric device 25 vary, for example, due to the fluctuations of the voltage from the power supply, the change in the ambient temperature, and the secular change; they are liable to affect largely the level of the output voltage 20a of a seismic sensor 20, that is, the sensitivity and the precision of a seismic sensor 20. Therefore, a seismic detector which should be used for a long duration can be prevented from being affected by the environmental and secular change.

Figure 25:
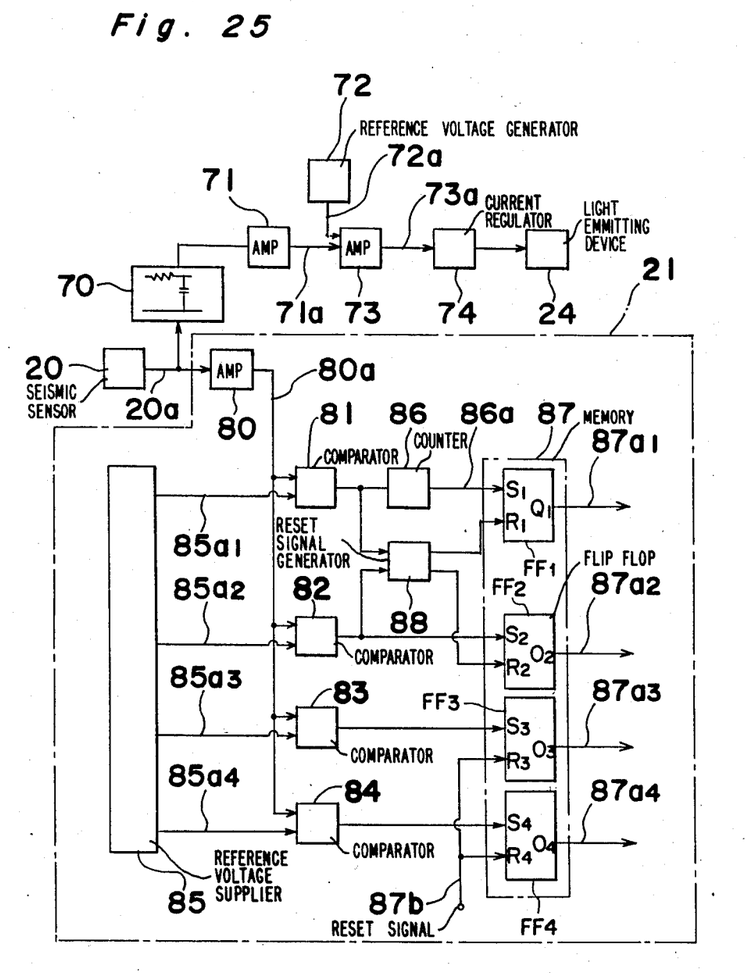
FIG. 25 is a block diagram of a signal processor.

FIG. 25 shows a block diagram of a signal processor wherein the variation of the emission of a light emitting diode can be compensated automatically. In this Example, the power source 23 of the light emitting diode 24 is replaced with a more complex circuit which can control the current of the light emitting diode 24 according to the dc component of the output 20a of a seismic sensor 20. The output voltage 20a from a seismic sensor 20 is transmitted via a filter 70 to a dc amplifier 71. The difference between the dc output signal 71a from the dc amplifier 71 and the reference voltage 72a are supplied from the reference voltage generator 72 are amplified by a differential amplifier 73. A current regulator 74 regulates the current which flow in a light emitting diode 24, corresponding to the output signal 73a from the differential amplifier 73.

The output voltage 20a from the seismic sensor 20 is also transmitted to an ac amplifier 80 which contains a band pass filter. The output signal 80a of the ac amplifier 80, that is, the ac components of the output voltage 20a is supplied to four comparators 81, 82, 83, 84. A reference voltage supplier 85 gives four reference levels 85$a_1$, 85$a_2$, 85$a_3$ and 85$a_4$ to the comparators 81, 82, 83 and 84, respectively. The reference levels 85$a_1$, 85$a_2$, 85$a_3$ and 85$a_4$ are set to be for example, 10, 80, 120 and 150 gals, respectively, according to the set levels of the technical standards of the Japan Elevator Association. When the output signal 80a is larger than the reference level 85$a_1$, the comparator 81 gives a high level signal to a counter 86. As long as the counter 86 counts up to a predetermined value, a set signal 86a is given to set terminal S1 of a flip flop FF1 of a memory 87. The memory 87 has four RS flip flops FF1, FF2, FF3, FF4. Comparators 82, 83, 84 provide set signals to set terminals S2, S3, S4 of flip flop FF2, FF3, FF4 of the memory 87 when the output signal 80a, is larger than the reference level 85$a_2$, 85$a_3$ and 85$a_4$, respectively. A reset signal generator 88 provides a high level to reset terminals R1 and R2 of flip flops FF1, FF2 of the memory 87 after the comparators 81 and 82 gives a low level signal for a predetermined time, respectively. If a high level signal is given to set terminals S1, S2, S3 and S4, the outputs Q1, Q2, Q3 and Q4 of the flip flops FF1, FF2, FF3 and FF4 give a high level signal 87$a$1, 87$a$2, 87$a$3 and 87$a$4 until a reset signal is given to reset terminals R1, R2, R3 and R4, respectively. The output signals 87$a$1, 87$a$2, 87$a$3 and 87$a$4 are transmitted for example to an elevator controller (not shown). The reset signal 87b is given manually by an operator.

In this Example, the current regulator 74 controls the magnitude of the current flowing through the light emitting diode 24 so that the dc component 71a of the output signal 20a after amplified by a dc amplifier 71 agrees always with the reference voltage 72a. Thus, the liquid 22, 52 can be illuminated with a constant intensity by the source of light 24. Then, the ac component 80a of the output signal 20a of the seismic sensor 20 has the same level when the seismic sensor 20 is rocked with the same magnitude of acceleration, even if the ambient temperature changes or the source of light 24 deteriorates. That is, the output signal 20a corresponds correctly to the magnitude of the acceleration.

Seismic waves can be classified in four stages in this signal processor. Preliminary waves consist mainly of vertical waves, and have the acceleration up to ten to a few tens gals. If preliminary waves having the acceleration above 10 gals occurs, the comparator 81 gives pulse signals continuously to the counter 86. The counter 86 in turn provides a set signal 86a to the flip flop in the memory 87 after it counts the predetermined number. Then, the memory 87 gives a stop signal 87$a$1 to the elevator controller (not shown) in order to stop the elevator car at the nearest floor.

Though external disturbances may rock the seismic sensor 20 with the acceleration above 10 gals, only one or discrete pulses are counted by the counter 86 in such situation, and the counter 86 does not give a set signal 86a to the flip flop FF1 of the memory 87. Thus, external disturbances can be distinguished from preliminary tremors without errors.

If the output signal of the comparator 81 remains low for a predetermined time (at least thirty seconds), the flip flop FF1 of the memory 87 is reset, and the elevator can be operated again automatically.

Main waves arrive after the preliminary tremors arrives. They consist mainly of horizontal waves and have the acceleration above a few tens gals in great earthquakes. At the instant that the acceleration exceeds 80 gals, the comparator 82 gives a set signal to the flip flop FF2 of the memory 87, and FF2 gives a stop signal 87$a$2 to the elevator. The elevator controller makes the elevator car stop at the nearest floor.

If the output signal of the comparator 81 remains low for a predetermined time (at least thirty seconds), the flip flop FF2 of the memory 87 is reset, and the elevator can be operated again automatically.

If the acceleration increases further above 120 gals and above 150 gals, the comparators 83, 84 give a set signal to flip flop FF3, FF4 of the memory 87, respectively. Then, FF3 and FF4 give operation inhibition signals 87$a$3, 87$a$4, respectively, to the elevator controller. An operator examines the elevator and if no damages are found, he gives a reset signal to FF3 and FF4, and the elevator will be operated again.

This type of a signal processor can choose the set levels freely according to the type of an elevator such as a superhigh speed elevator for a superhigh building and to the type of operation such as the designation of the express zone where an elevator car does not stop. Therefore, if a seismic detector controller of this type is installed in the elevator controller, it can operate an elevator under an earthquake according to the necessities of each elevator system.

Example 7

Figure 26:
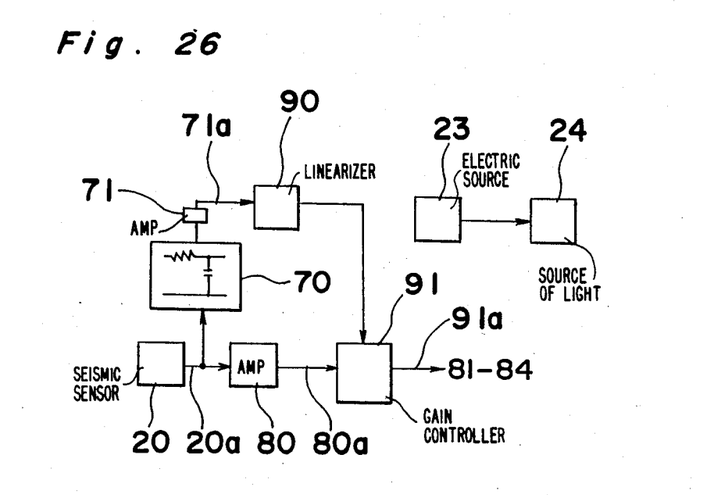
FIG. 26 is a block diagram of a part of a signal processor.
Figure 27:
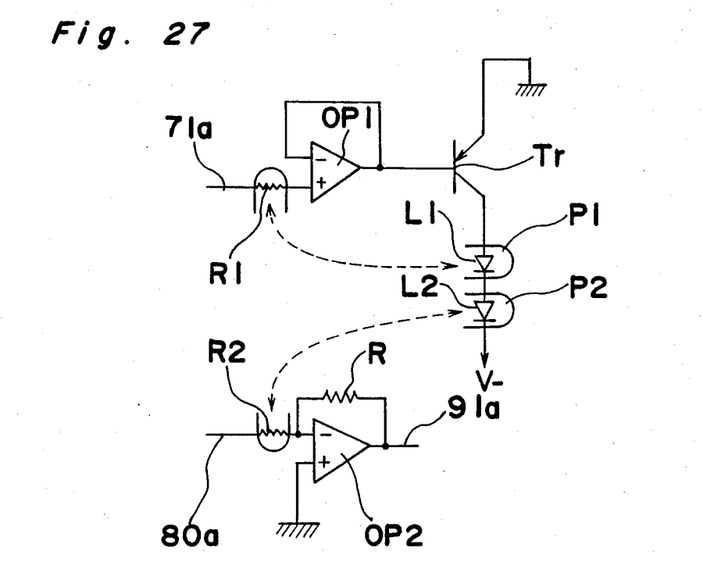
FIG. 27 is a circuit diagram of linearizer and gain controller.

FIGS. 26 and 27 give another example to complement the sensitivity of the photoelectric device 24 by controlling the gain of the amplification in the signal processor 21. The dc component of the output signal 20a of the seismic sensor 20 is fed to a linearizer 90, after taken out of the output signal 20a by a filter 70 and amplified by a dc amplifier 71. On the other hand, the ac components of the output signal 20a, after amplified by an ac amplifier 80, is provided to a gain controller 91, where the gain of the ac signal 80a is controlled by an output signal of the linearizer 90 so as to complement the change in the output characteristics of the source of light 24. The output signal 91a of the gain controller 91 is provided to the comparators 81–84 as shown in FIG. 25.

Details of an example of the linearizer 90 and the gain controller 91 are shown in FIG. 27. The output signal 71a of the dc amplifier 71 is provided via a resistor R1 of a photocoupler P1 to + input of an operational amplifier OP1. The − input and the output of the operational amplifier OP1 are connected with each other so that the operational amplifier OP1 acts as a voltage follower. The output of the operational amplifier is also connected to the base of the transistor Tr while the collector of the transistor Tr is connected via diodes L1, L2 of photocouplers P1, P2, in series to a negative voltage V−.

The ac signal 80a is provided via a resistance R2 of a photocoupler P2 to the − input of an operational amplifier OP2. A resistance R is connected between the − input and the output of the operational amplifier OP2. The + input is connected to the earth. The gain (R/R2) of the gain controller 91 is affected by the collector current of the transistor Tr of the linearizer 90.

If the dc component 71a of output signal of the photoelectric device 25 decreases below the normal level, the collector current of the transistor Tr increases so that the light emitting diode L2 emits more light to the resistance R2, and the restance R2 decreases. Then, the gain (R/R2) of the gain controller 91 increases so as to complement the decrease in the brightness inside the container 21, 51 of the seismic sensor 20. On the contrary, if the dc component of the photoelectric device 25 increases above the normal level, the collector current of the transistor Tr decreases and the gain (R/R2) of the gain controller 91 decreases. Thus, even if the intensity of the emission of the light of the light emitting diode 24 varies with environmental and secular changes, the seismic sensor 20 will operate properly.

What is claimed is:

1. A seismic detector comprising:
    a cylindrical container having an interior sealed off from all external lights, said container having an interior bottom of a cone-like shape;
    a liquid means contained in the bottom of the container;
    a source of light for illuminating the inside of the container, arranged above the liquid means in the container;
    a photoelectric sensor means, arranged above the liquid means in the container, for receiving the light reflected from the surface of the liquid means by the light emitted from the source of light and for transforming the amount of light received into an electric signal in order to detect the vibrations of the liquid means as a change in the amount of the light received; and
    a signal processor means for generating an output signal when the output signal of the photoelectric sensor means exceeds a predetermined value to provide an indication of a seismic event.

2. A seismic detector according to claim 1, wherein said liquid means is mercury.

3. A seismic detector according to claim 1, wherein said liquid means is oil.

4. A seismic detector according to claim 1, wherein the cone-like bottom of said container has an apex angle between 80° and 120°.

5. A seismic detector according to claim 1, wherein said apex angle is about 100°.

6. A seismic detector according to claim 1, wherein said signal processor means have one or more comparator means each of which compares the output signal of the photoelectric sensor means with a predetermined value different from that of other comparator means.

7. A seismic detector according to claim 1, wherein said source of light and said photoelectric device are arranged along the central axis of said container.

8. A seismic detector according to claim 1, wherein said signal processor means has an AC amplifier means which can provide an indication of the slope of the surface of the liquid means as a change in the amount of the light reflected from the surface of the liquid means.

9. A seismic detector according to claim 1, wherein said signal processor means includes a correction means which corrects the sensitivity of the detection of the light according to the DC component of said electric signal of said photoelectric sensor means.

10. A seismic detector according to claim 9, wherein said correction means is a means for varying an electric voltage supplied to said source of light according to the DC component of said electric signal of said photoelectric sensor means.

11. A seismic detector according to claim 9, wherein said correction means is a means for varying the gain of said AC amplifier according to the DC component of said electric signal of said photoelectric sensor means.

12. A seismic detector comprising:
    a cylindrical container having an interior sealed off from all external lights, said container having an interior bottom of a cone-like shape;
    a liquid means contained in the bottom of the container, the liquid means including two liquids of a different kind;
    a source of light for illuminating the inside of the container, arranged above the liquid means in the container;
    a photoelectric sensor means, arranged above the liquid means in the container, for receiving the light reflected from the surface of the liquid means by the light emitted from the source of light and for transforming the amount of light received into an electric signal in order to detect the vibrations of the liquid means as a change in the amount of the light received; and
    a signal processor means for generating an output signal when the output signal of the photoelectric sensor means exceeds a predetermined value.

13. A seismic detector according to claim 12, wherein one of said liquids is a first liquid which does not transmit or absorb the light and has a high reflectivity at the surface of the liquid.

14. A seismic detector according to claim 13, wherein one component of said liquids is mercury.

15. A seismic detector according to claim 12, wherein one component of said liquids is mercury.

16. A seismic detector according to claim 12, wherein one of said liquids is a second liquid which can dampen the motion of the first liquid.

17. A seismic detector according to claim 16, wherein the second liquid is oil.

18. A seismic detector according to claim 12, wherein the cone-like bottom of said container has an apex angle between 80° and 120°.

19. A seismic detector according to claim 18, wherein said apex angle is about 100°.

20. A seismic detector according to claim 12, wherein said signal processor means have one or more comparator means each of which compares the output signal of the photoelectric sensor means with a predetermined value different from that of other comparator means.

21. A seismic detector according to claim 12, wherein said source of light and said photoelectric device are arranged along the central axis of said container.

22. A seismic detector according to claim 12, wherein said signal processor means has an AC amplifier means which can give the slope of the surface of the liquid means as a change in the amount of the light reflected from the surface of the liquid means.

23. A seismic detector according to claim 12, wherein said signal processor means includes a correction means which corrects the sensitivity of the detection of the light according to the DC component of said electric signal of said photoelectric sensor means.

24. A seismic detector according to claim 23, wherein said correction means is a means for varying an electric voltage supplied to said source of light according to the DC component of said electric signal of said photoelectric sensor means.

25. A seismic detector according to claim 23, wherein said correction means is a means for varying the gain of said AC amplifier according to DC component of said electric signal of said photoelectric sensor means.

* * * * *